Oct. 18, 1927.
R. J. PAGE
1,645,620
VEHICLE RESILIENT WHEEL
Filed March 16, 1925
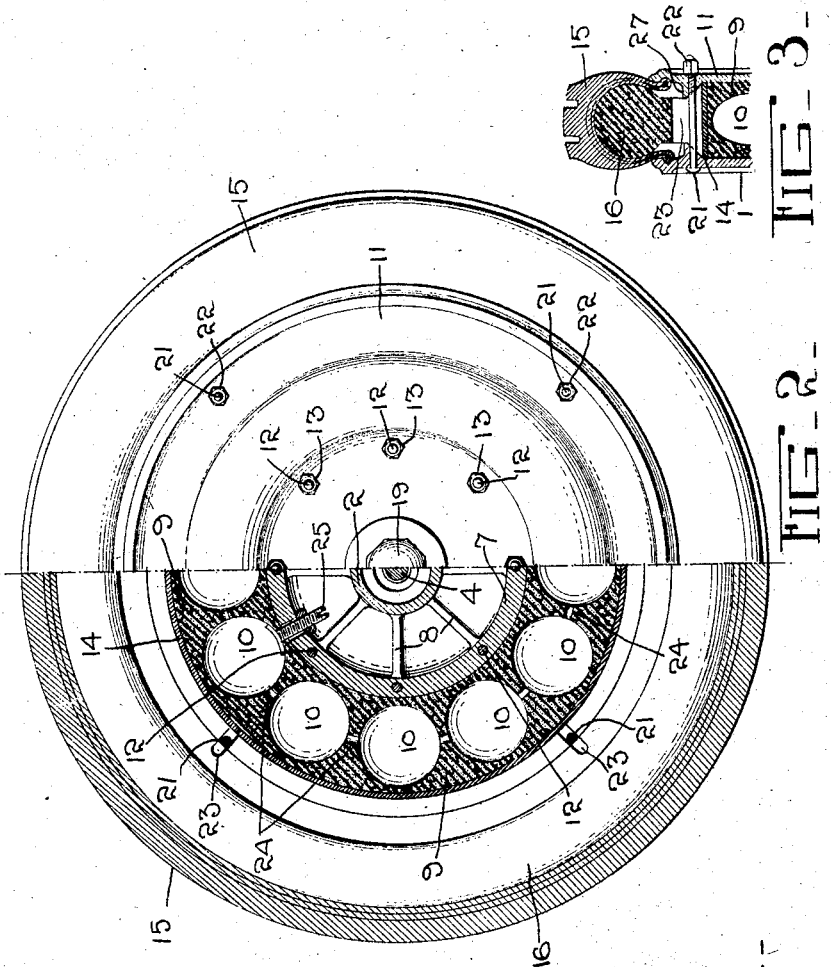
Inventor
R. J. Page
by Langner, Parry, Card & Langner
Attys.

Patented Oct. 18, 1927.

1,645,620

UNITED STATES PATENT OFFICE.

REGINALD JOHN PAGE, OF PONSONBY, AUCKLAND, NEW ZEALAND.

VEHICLE RESILIENT WHEEL.

Application filed March 16, 1925, Serial No. 16,043, and in New Zealand October 3, 1924.

This invention relates to road vehicle wheels of the semi-pneumatic type wherein it is claimed that the easy riding qualities of the pneumatic tyre are obtained along with the non-puncturable qualities of the solid rubber tyre.

The present invention has for its object the provision of an improved construction of wheel of the aforesaid type, and wherein the qualities or advantages above mentioned are obtained with the added advantages that the tread portion of the wheel is capable of being renewed as required, ordinary pneumatic tyre covers are easily adapted for use thereon, the walls of the air chambers are secure against puncture, and increased resiliency is obtained.

The main feature of the invention consists in providing a vehicle road wheel which has fitted around an unyielding central portion, an annular member of resilient material containing air pockets, said annular member having fitted to its periphery a removable and unpuncturable tread portion.

The annular member of resilient material containing the air pockets and the removable tread portion are held in position by plates adapted to be bolted together through the central unyielding portion of the wheel, said plates being provided with grooves or recesses for permitting distortion of the resilient annular member under the weight of the load borne by the wheel.

In order that the invention may be more readily understood it will be further described with the aid of the accompanying drawing, wherein:—

Figure 1 is a cross sectional elevation of the improved wheel,

Figure 2 is a part sectional elevation and part side elevation of the wheel, and Figure 3 is a part cross sectional elevation of the tyre, resilient filling and annular member, showing the method employed of passing bolts through the outer edges of the discs to hold the latter against side or outwards pressure.

The wheel comprises a circular plate or disc 1 provided at its centre, and on its inner face, with a boss 2 which is recessed or bored to receive suitable roller bearings 3 adapted to be passed upon an axle 4 of a road vehicle. In the case of a front wheel of a vehicle as shown in the accompanying drawing, the axle 4 is fixed or stationary, and the wheel is adapted to rotate freely around the same on the roller bearings 3.

Where it is desired to use the wheel on a rear or driving axle of a vehicle, the said wheel can be keyed or otherwise secured on such axle as required.

A washer 5 passed on the end of the axle 4 and a suitable nut 6 screwed on the latter hold the bearings 3 and complete wheel assembly in position on the axle.

A circular flange 7 formed integral with the disc or plate 1 and projecting from the same face of the latter as the boss 2, is located concentrically with and around said boss, but some distance from the edge of the disc 1.

A number of radial webs 8 are formed between the flange 7 and the periphery of the boss 2 in order to support said flange 7 and strengthen the latter in order to enable it to resist strains imposed on its periphery.

An annular member 9 formed of resilient material such as sponge rubber or the like, is passed around and fits neatly on the periphery of the flange 7, while an endless band or belt 14 of leather is fitted around the outer surface of the annular resilient member 9 to protect the latter.

The member 9 is preferably rectangular in cross section in order that it will lie closely against the face of the circular plate or disc 1 and upon the periphery of the flange 7, and contains a plurality of pockets or spaces 10 adapted to contain air under pressure.

A further circular plate or disc 11 having the same diameter as the disc 1 is formed with a central opening to pass upon the outer end of the boss 2, when the said disc 11 is drawn against and held in contact with the outer faces of the flange 7 and annular member 9 by means of bolts 12 passed through the disc 1, flange 7 and disc 11, and by means of nuts 13 screwed on said bolts 12 outside the last mentioned disc.

The outer edges of both the discs 1 and 11 extend a short distance beyond the leather band or belt 14 and provide flanges between which a tyre cover 15 can be placed and held around said leather band or belt 14.

The tyre cover 15 is provided with a solid filling 16 of resilient material such as sponge rubber, having any cross sectional shape.

In its preferred form, the rubber filling 16 is shaped to fit the inside of the tyre cover 15 and is extended inwardly and completely around its inner periphery to provide a portion adapted to contact against the tread of the leather band or belt 14 which is in turn fitted around the periphery of the annular resilient member 9.

Annular grooves or recesses 17 formed in the inner faces of the discs 1 and 11, directly opposite the annular resilient member 9 held between said discs and around the flange 7, provide spaces into which the said member 9 can expand sideways upon its being compressed between the yielding tread portion and the unyielding central portion of the wheel.

An outwardly turned flange 18 formed around the central opening of the disc 11, is screw threaded externally to receive an internally screw threaded cap 19 which is adapted to close such central opening and prevent the passage of dust, dirt and the like into the bearings 3 through the open outer end of the boss 2.

In action, minor road shocks or jars are absorbed by the resilient filling 16 of the tyre cover 15 while the more violent shocks or jars are transmitted to the annular resilient member 9 causing the latter to be distorted and expanded sideways. This resilient member 9, by reason of the air under pressure in its pockets 10, is extremely resilient and is adapted on pressure being applied to its outer surface through the tyre cover 15, and filling 16 thereof to be compressed between the latter and the flange 7 which supports it, the annular grooves or recesses 17 in the discs 1 and 11 permitting side expansion of said member 9, whereby the latter absorbs any shocks or jars and prevents their transmission to the vehicle axle 4.

The leather band or belt 14 is provided between the tyre filling 16 and the resilient member 9 in order to prevent wear of the latter by friction produced by creeping of the tyre around the wheel, and also to provide a protective cover on the outer surface of said resilient member 9 through which the passage of any foreign body picked up by the tyre from the road surface, is rendered difficult.

The wheel can be dismounted by removing the cap 19 and unscrewing the nut 6 whereupon the whole wheel can be drawn off the axle 4. When it is desired to merely inspect the annular resilient member 9 or to renew the tyre cover 15, the nuts 13 are unscrewed from the bolts 12, and the disc 11 together with the cap 19 screwed thereon is removed, to expose such parts and facilitate their removal or replacement.

If desired, bolts 21 can be passed through the discs 1 and 11 near their edges and provided outside the former disc with nuts 22, whereby any tendency of the said discs 1 and 11 to spring apart at their edges due to side pressure of the resilient member 9 or tyre filling 16 may be prevented. When such bolts 21 are provided, radial slots 23 are formed in the resilient tyre filling 16 extending inwards from the latter's inner periphery, to enable said filling to be passed on said bolts without in any way interfering with the compressing movement thereof on the annular member 9.

Where it is desired to use the wheel on a driving axle of a vehicle, the disc 1 can have secured on its outer face, a suitable brake drum 20, as shown by the dotted lines in Figure 1 of the accompanying drawing.

Annular projections or flanges 27 formed on the inner faces of the discs 1 and 11 near their outer edges are adapted to limit or restrict the inward compressing movement of the tyre filling 16 on the resilient member 9 so that, should the pockets 10 in the latter become deflated, said filling 16 will not be pressed inwards beyond said projection or flanges, and the wheel may be continued in use, the resiliency of the tyre filling 16 preventing any such damage to the wheel as would occur through running on a deflated or punctured pneumatic tyre.

The air pockets 10 in the resilient member 9 can be placed in communication with one another by means of an air passage 24 formed through the member 9, and one of the pockets 10 can be provided with a suitable air valve 25 adapted to project through the flange 7 into the space between the latter and the boss 2 of the wheel, means being provided in the disc 11 as at 26, whereby the air hose of a pump or the like may be introduced within the wheel and connected to the valve 25 when it is desired to fill the pockets 10 with air under pressure.

By reason of the fact that the air filled pockets 10 in the member 9 are located at a considerable distance from the road surface, it is extremely unlikely that there would be any possibility of the same being punctured by any foreign body lying on such road surface, while the resilient member 9 acting in conjunction with the resilient tyre filling 16 of the tyre 15 provides an extremely resilient and easy riding wheel.

What I do claim and desire to obtain by Letters Patent of the United States of America is:—

A road vehicle wheel, comprising, an annular inner compressible member, air pockets in the member, a removable tire surrounding the inner member, a rigid central portion within the inner member, side plates for the wheel one of which is connected with the central portion, outwardly bowed recesses in the plates positioned to permit outward distortion of the inner member.

In testimony whereof I have signed my name to this specification.

REGINALD JOHN PAGE.